US008205877B2

(12) United States Patent
Spinetti

(10) Patent No.: US 8,205,877 B2
(45) Date of Patent: Jun. 26, 2012

(54) METHOD AND MODULE FOR STORING AND DISPENSING PLANAR ITEMS SUCH AS BANKNOTES, WADS OF BANKNOTES OR THE LIKE

(76) Inventor: Alberto Spinetti, Castronno VA (IT)

( * ) Notice: Subject to any disclaimer, the term of this patent is extended or adjusted under 35 U.S.C. 154(b) by 165 days.

(21) Appl. No.: 12/529,060

(22) PCT Filed: Mar. 10, 2008

(86) PCT No.: PCT/IB2008/000556

§ 371 (c)(1),
(2), (4) Date: Oct. 1, 2009

(87) PCT Pub. No.: WO2008/110893

PCT Pub. Date: Sep. 18, 2008

(65) Prior Publication Data

US 2010/0096798 A1 Apr. 22, 2010

(30) Foreign Application Priority Data

Mar. 14, 2007 (IT) .............................. MI2007A0512

(51) Int. Cl.
*G11B 23/087* (2006.01)

(52) U.S. Cl. ..................... 271/213; 242/324.2; 242/325; 242/437.4; 242/528; 242/613.3

(58) Field of Classification Search .................. 271/213; 53/587; 242/324.1, 324.2, 325, 437, 437.4, 242/528, 613.3, 905
See application file for complete search history.

(56) References Cited

U.S. PATENT DOCUMENTS

| | | | | |
|---|---|---|---|---|
| 575,653 | A * | 1/1897 | Lee | 361/301.5 |
| 3,471,098 | A * | 10/1969 | Jannett | 242/411 |
| 5,312,064 | A * | 5/1994 | Uesugi et al. | 242/537 |
| 2006/0097444 | A1* | 5/2006 | Spinetti | 271/216 |

FOREIGN PATENT DOCUMENTS

| | | | |
|---|---|---|---|
| JP | 59069332 | A | 4/1984 |
| WO | 2004/063065 | A | 7/2004 |

* cited by examiner

*Primary Examiner* — Jeremy R Severson
(74) *Attorney, Agent, or Firm* — Hess Patent Law Firm, PC; Robert J. Hess

(57) ABSTRACT

A method and a module are described for storing and dispensing flat items such as banknotes or wads of banknotes, wherein the items are retained between ribbon means and deposited on a rotating support element having at least two faces comprising one or more flat or convex portions, after crossing a pair of feed-in/dispensing main rollers. Means are provided for adjusting the length of the ribbon means along the portion that extends between the points of contact with the main rollers and the points of contact with the supporting element and/or with the items stored on the same.

28 Claims, 6 Drawing Sheets

METHOD AND MODULE FOR STORING AND DISPENSING PLANAR ITEMS SUCH AS BANKNOTES, WADS OF BANKNOTES OR THE LIKE

FIELD OF THE INVENTION

The present invention concerns a method and a module for storing and dispensing flat items such as banknotes or wads of banknotes, for example.

BACKGROUND OF THE INVENTION

An example of a method and a module of this type has already been described in the international patent application no. WO 2004/063065, to which reference will be made hereinafter for all elements not explicitly mentioned or illustrated in the present description.

According to the above document, flat items are stored on a substantially flat rotating support element (or plate), using for example a pair of ribbons or films which are wound on the plate to retain each item on the two faces of the plate.

The solution proposed in the preceding international patent application offers the possibility of substantially flat storage of many types of materials, in particular banknotes, but the same principles apply to any other type of support, be it paper, plastic, metal or similar. The documents or supports that can be treated can have the form of a single sheet, a sheet folded in two or more parts, or documents formed of several pages and can also be enclosed in envelopes or similar containers.

The type of module described in the preceding international application has been advantageously used in various applications, both individually and combined with other similar or identical modules, also in different equipment for the production of new more or less complex machines or also in new versions of machines already existing on the market.

After each storage phase, in which each item is placed on top of those already retained on the faces of the plate, the thickness of the “magazine”, consisting of the plate and the items retained on it, increases significantly in the direction of the faces but not in the direction of the edges of the plate. For example, if banknotes are stored, the thickness of each banknote is approximately 0.1 mm, while each of the two ribbons or films is approximately 0.020 mm (20 microns). If 100 banknotes are deposited on each face of the plate, each retained between two ribbons, the thickness in the direction of each of the flat or convex faces of the plate will be approximately 14 mm while the thickness along each of the edges will be only approximately 4 mm.

It has been found that, as the dimensions of the magazine increase, two important effects occur:

- a shifting of the position of the banknotes towards the edges with respect to the flat or convex faces of the plate;
- the need for an increasing amount of ribbon as a result of the semi-perimeter of the polygonal shape formed by the banknotes deposited on the plate and by the ribbon (or ribbons) that envelop them.

This occurs whether one single ribbon or two are wound on the plate.

These variations can be predicted and consequently controlled or compensated for via appropriate programming of the module control unit, when the same is used for single banknotes or in any case supports/documents all having at least the same thickness. In fact, positioning of the banknotes at the edges of the plate must be avoided, otherwise the advantages relating to the storage capacity and conservation of the banknotes in a flat condition are lost.

Different forms of control must be provided when the objects to be stored have a thickness which varies and cannot be predicted beforehand.

For example, in applications such as timed safes, it is envisaged that fixed sums will be deposited each time (e.g. € 1,000) independently of the denominations making up said sums. Consequently a deposit could consist of two € 500 banknotes and the following one of one hundred € 10 banknotes, or in general of wads for a fixed pre-set amount but consisting of an undefined number of mixed banknotes.

In view of the above, the aim of the present invention is to propose a method and a module for storing and dispensing flat items which permits the correct positioning of flat items on a rotating support element, or plate, independently of the variability in thickness of the flat items stored or dispensed.

A particular object of the present invention is to propose a method and a module of the type described above which permits correct storing and dispensing not only of single banknotes but also of wads of banknotes independently of the number of banknotes that make up each wad.

A further object of the present invention is to propose a module that can be easily integrated with, or can replace, similar modules already installed in a machine for storing and dispensing flat items such as banknotes or the like.

SUMMARY OF THE INVENTION

These objects are achieved by the present invention thanks to a method according to claim 1 and to a module according to claim 15. Further characteristics of the present invention are described in the respective dependent claims.

According to a first aspect of the present invention, the flat items of varying thickness, for example banknotes or wads, are stored in a module which includes:

- at least one pair of feed-in/dispensing rollers;
- at least one rotating support element having at least two faces comprising one or more flat or convex portions; and
- ribbon means which are wound on the supporting element to retain the flat items at the level of at least one of the faces of the supporting element during the storage phases, and which are unwound from the supporting element to release the flat items from the supporting element during the dispensing phases, and in which the ribbon means pass around the main rollers.

To allow each of the items stored to be positioned correctly on the supporting element, the length of the ribbon means is adjusted in the portion that extends between the points of contact with the main rollers and the points of contact with the supporting element and/or with the items stored on the same.

The length adjustment can be obtained in various ways. A first possibility is that of varying the rotation starting angle of the supporting element. It is also possible to obtain the same length adjustment using one or more guide rollers which act on the ribbon means between the points of contact with the supporting element and the points of contact with the main rollers.

Alternatively, the storage module can consist of two separate parts, the first part including the rotating support element and the second part including the main rollers. The length adjustment can thus be obtained by varying the reciprocal distance between the two parts that make up the module.

Another way of obtaining the length adjustment, at least in the storage phase, is to activate rotation of the supporting element and simultaneously adjust the flow speed of the flat items before they reach the main rollers, for example by adopting feed rollers positioned upstream of the main rollers with respect to the direction in which the flat items are fed into the module.

For the sake of simplicity, the above methods are envisaged as alternatives to one another, but a combination of one or more of said methods could also be used.

The length variation of the ribbon means is obtained after each feed-in phase or after each dispensing phase of at least one of the flat items.

Each module is provided with a control unit which is programmed to receive data on the amount of ribbon means required to store the last flat item fed into the module. At each storage phase, the control unit memorises said amount and calculates the length variation of the ribbon means that will be required to arrange the next flat item on one of the two faces of the supporting element in the correct position.

The same procedure in reverse will be used after a dispensing phase of the last flat item stored, taking the last data memorised and then adjusting the length variation to the one preceding feed-in of the flat item dispensed.

The length of the ribbon means wound on the supporting element at each storage (or dispensing) cycle can be for example determined on the basis of the detection of signalling devices combined with said ribbon means, or on the basis of the detection of signalling devices combined with one or more encoder discs rotated by the movement of the ribbon means.

In the same way, the position and/or the angular velocity of the supporting element can be determined by the detection of one or more encoder discs provided with signalling devices and integral in rotation with the supporting element.

The signalling devices on the ribbon means and on the encoder discs can be for example of the optical type, or of the magnetic type, or a combination of optical and magnetic signalling devices.

In accordance with a second aspect of the present invention, a module is provided for storing and dispensing flat items such as banknotes or wads of banknotes, comprising adjustment means for adjusting the length of the ribbon means along the portion that extends between the points of contact with the main rollers and the points of contact with the supporting element and/or with the items stored on the same.

BRIEF DESCRIPTION OF THE DRAWINGS

Further characteristics and advantages of the present invention will emerge more clearly from the following description with reference to the accompanying drawings, in which.

DETAILED DESCRIPTION OF THE INVENTION

FIGS. 1A-1D illustrate schematically a rotating support element 10 (or plate) having two slightly convex faces indicated by X and Y, on each of which the flat items will be stored, for example banknotes and/or wads consisting of a varying number of banknotes.

Figure 1A:
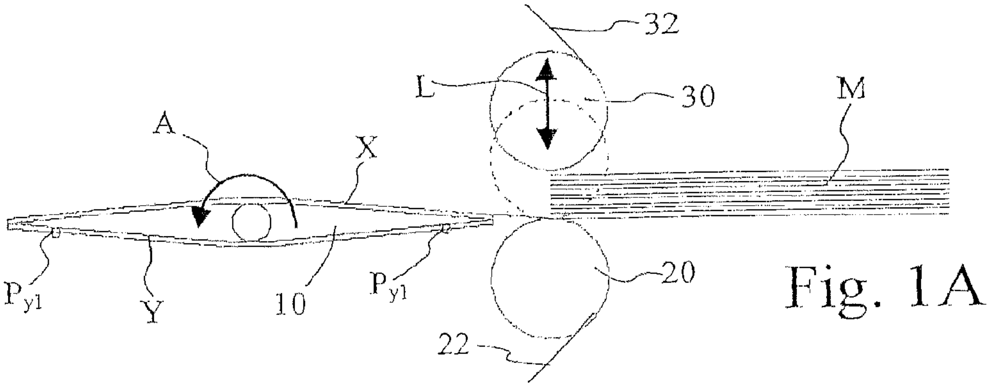
FIGS. 1A-1D illustrate schematically some storage phases of flat items to highlight the correct positioning of flat items on a rotating support element according to the present invention.

In the arrangement represented here, a flat item is stored by rotating the plate 10 anticlockwise, as indicated by the arrow A in FIG. 1A. The points $P_{y1}$ represent the limits within which it is assumed that each flat item will be deposited on the face Y of the plate 10.

The flat items pass through a pair of main rollers 20 and 30 around which respective ribbon means are wound, for example a lower film 22 and an upper film 32. The upper roller 30 moves in a rectilinear direction L perpendicular to its axis of rotation to allow the transit of items of different thickness.

In FIG. 1A the plate 10 is initially empty and is in the starting position with the face X directed upwards and the face Y directed downwards. A wad M of a certain number of banknotes is about to be stored on the face Y of the plate 10.

Figure 1B:
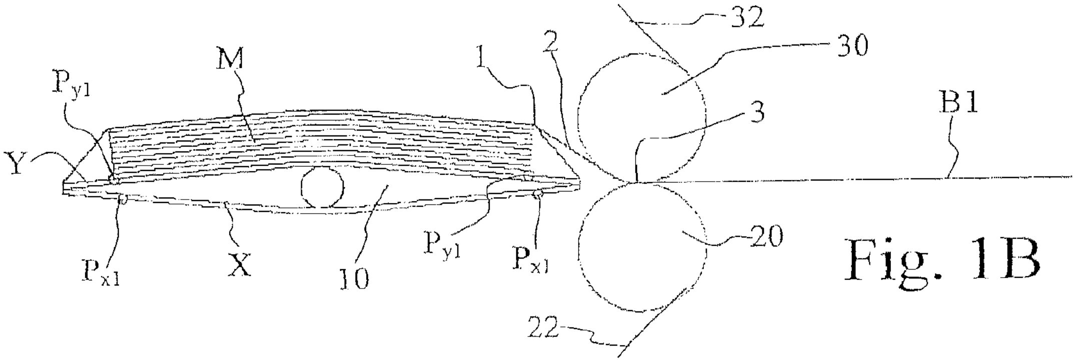
Figure 1C:
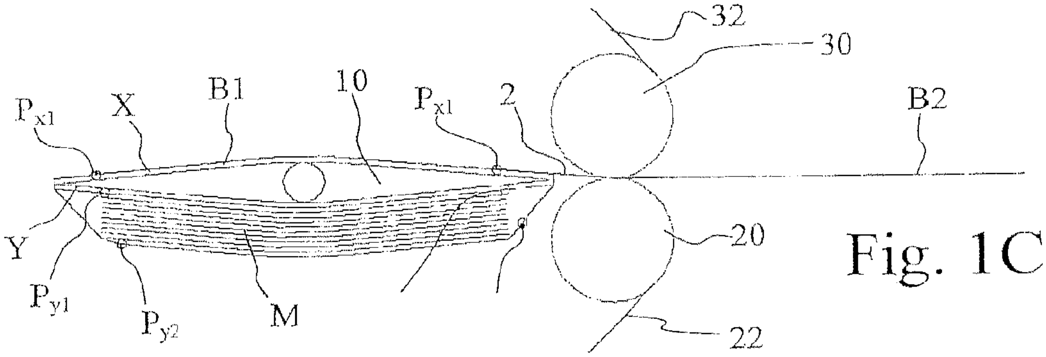

When the plate begins to rotate in the direction indicated by the arrow A, the wad M retained between the two films 22 and 32 will rest on the face Y positioning itself correctly between the points $P_{y1}$, as illustrated in FIG. 1B. It is now assumed that a single banknote B1 has to be deposited on the other face X of the plate 10.

FIG. 1B highlights the portion 2 (or section) of film that extends between the points of contact 1 with the plate 10 (or in any case with the upper edge of the wad M already deposited) and the points of contact 3 of the films with the main rollers 20 and 30.

Owing to the length of the section 2 and the new shape assumed by the plate 10 due to the films enveloping the wad M, the limits $P_{x1}$ within which the banknote B1 will be positioned as it is deposited on the face X are not aligned with the limits $P_{y1}$ identified on the face Y for the first deposit of the wad M. The banknote B1 will therefore assume the position indicated in FIG. 1C.

The effect is even more evident when another banknote B2 is deposited, which will position itself on the face Y above the wad M already stored. For the sake of simplicity, the deposit of a further single banknote is illustrated, but the result does not change if, instead of the latter, a wad of any thickness is deposited.

Figure 1D:
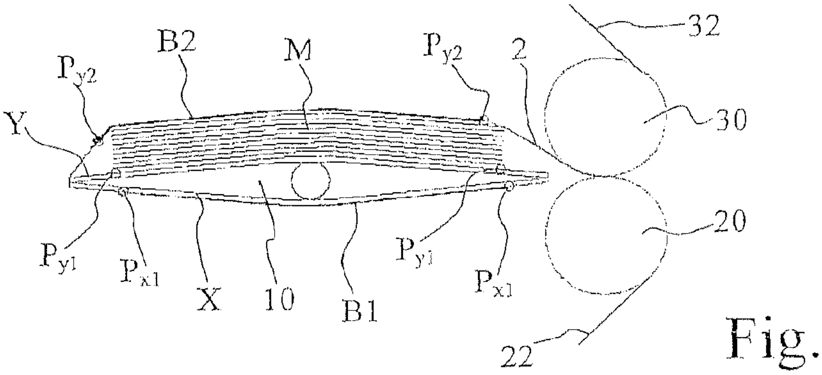

As can be seen in FIG. 1D, due to the above-mentioned causes, the subsequent banknote B2 will be positioned within the limits indicated by the points $P_{y2}$, which are displaced to an even greater extent with respect to the preceding $P_{y1}$ and $P_{x1}$ of the first deposits on the respective faces of the plate 10. It is therefore evident that, when subsequent deposits are made, there is the risk of the banknotes, or even worse the wads, superimposing themselves on the edges of the plate 10.

The present invention therefore aims to overcome these drawbacks by adjusting the length of the section 2 after each deposit so that, at the next deposit, a banknote or a wad is arranged in the correct position above one of the faces of the plate.

Figure 2:
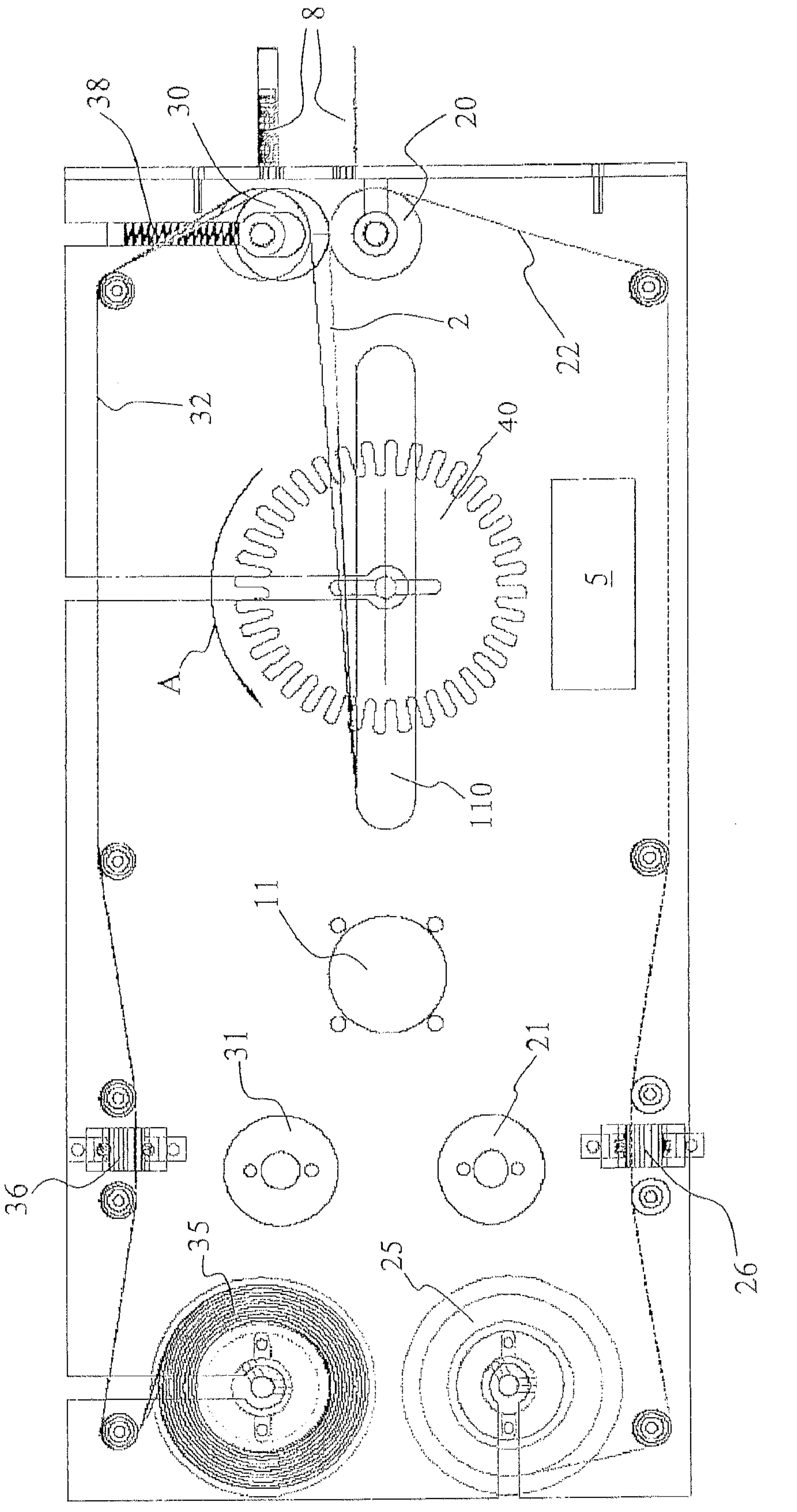
FIG. 2 is a lateral view of a module for the storage of flat items according to a possible embodiment of the present invention.
Figure 3A:
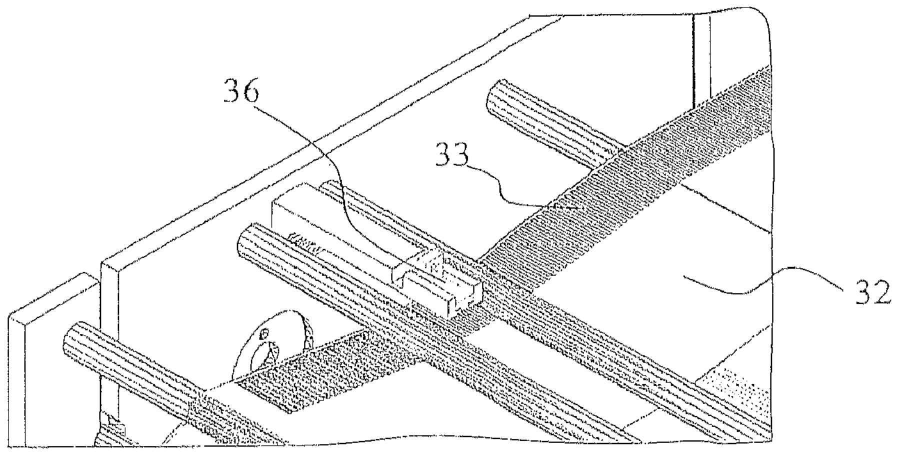
FIG. 3A is a perspective view which highlights some details of the module of FIG. 2.
Figure 3B:
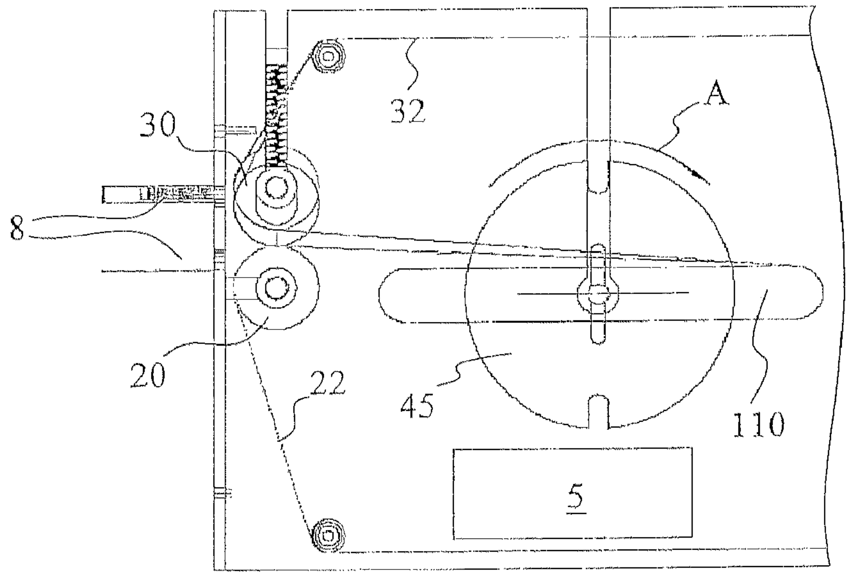
FIG. 3B is a lateral view of a part of the module of FIG. 2, from the opposite part.

FIGS. 2 and 3A and 3B schematically represent a module for storing and dispensing banknotes or wads of banknotes according to a possible embodiment of the invention. The module shown here is designed to perform the length adjustment of the section 2 by varying for example the rotation starting angle of the supporting element or plate 110.

Referring in particular to FIG. 2, this embodiment presents a rotating plate 110 comprising two flat surfaces with rounded edges which is rotated by an electric motor 11 controlled by a control unit 5. A group of sensors 8 positioned at the module inlet detect the presence of a banknote or a wad of banknotes and thus provide the control unit 5 with the signal to start a storage phase or conclude a dispensing phase.

It can furthermore be noted that the main roller 30 moves in a vertical direction against the thrust of a spring 38 which tends to push it towards the contact position with the main roller 20. The latter is kept fixed with respect to the other roller, but can in turn be movable alternatively to or in combination with the main roller 30.

The unit 5 also controls the motors 21 and 31 which rotate the reels 25 and 35 on which the lower film 22 and the upper film 32 are wound. During the storage phases, the motors 21 and 31 release the respective films while exerting a slight braking action to maintain the tensioning thereof, whereas during the dispensing phases they recover the films, nevertheless maintaining a slight tension thereon.

Each of the ribbons 22 and 32 bears optical signalling devices which are detected by respective optical sensors 26 and 36, which in turn provide the control unit 5 with a signal indicating the quantity of film taken from the reels 25 and 35, in addition to signals indicating that one of the ends of the films has been reached to signal that the plate is full or empty. The optical signalling devices consist for example of opaque bars on transparent films, as illustrated for example in FIG. 3A for the signalling devices 33 present along one edge of the upper film 32.

To determine the angle of the plate 110 after each storage or dispensing phase, optical encoder discs 40 and 45 are used, rotating integrally with the plate 110. The disc 45 (FIG. 3B) comprises only two diametrically opposed peripheral notches and serves to determine rotation of the disc by 180°, while the disc 40 in FIG. 2 has 36 notches for fine adjustment by approximately 10° of the position of the plate 110.

Figure 4:
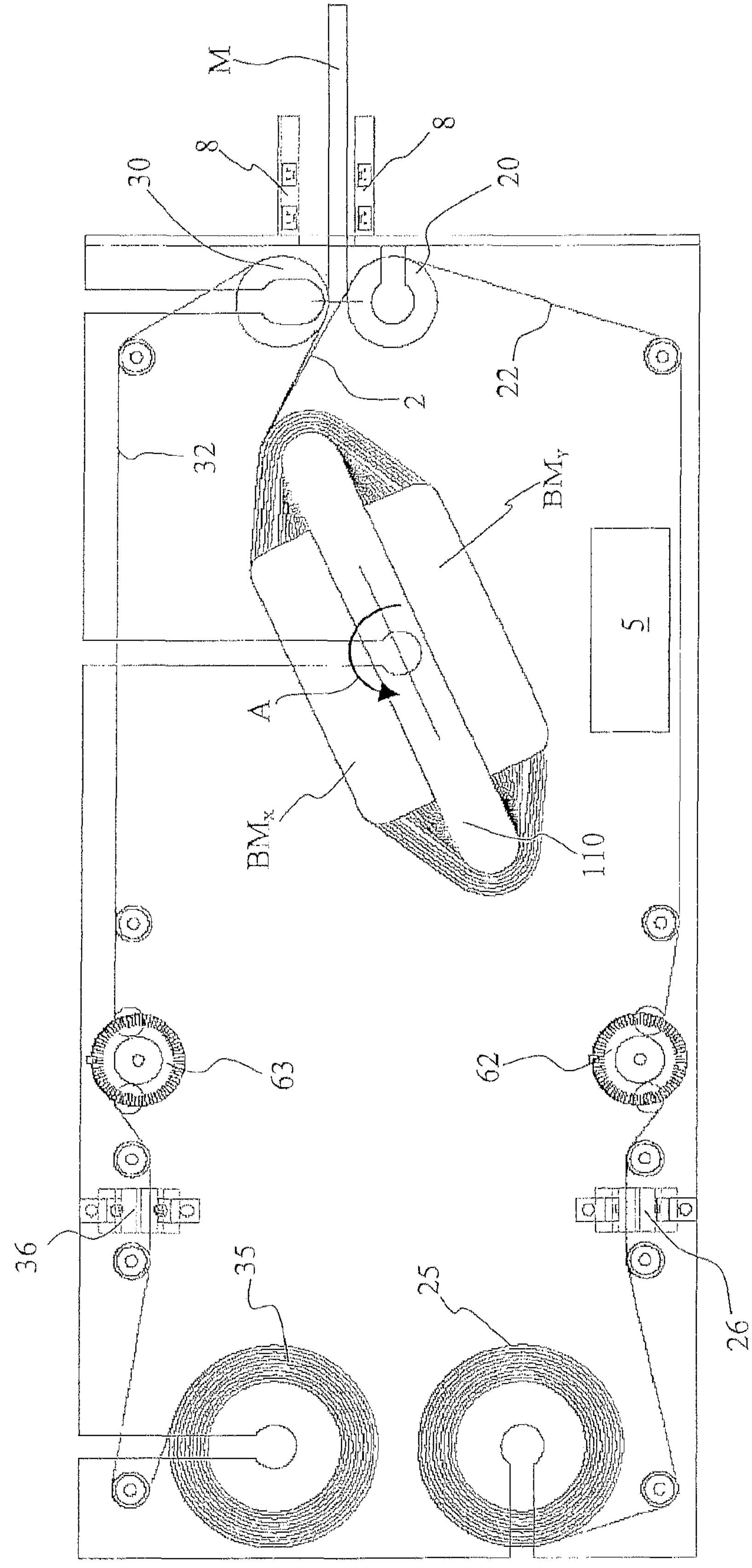
FIG. 4 is a lateral view of a module for the storage of flat items according to another embodiment of the present invention.

FIG. 4 illustrates another embodiment of a module in which the quantity of film used in each storage phase is detected by means of encoder discs 62 and 63 which are rotated by the movement of the respective films 22 and 32. The signalling devices positioned on the perimeter of the discs 62 and 63 are read by respective optical sensors (not shown) and provide greater reading precision than the signalling devices on the films themselves. There are also the optical sensors 26 and 36 which detect when the plate is full or empty by means of optical signalling devices on the films at the level of the respective terminal portions.

FIG. 4 also illustrates the plate 110 which has been positioned at a certain angle with respect to the horizontal to appropriately vary the length of the sections 2 following the previous storages of wads and banknotes $BM_x$ and $BM_y$ on the plate 110. The wad M presented at the module inlet will therefore be correctly positioned above the pack $BM_y$. In FIG. 4 it can also be noted that when a wad of a certain thickness is fed in, the sections 2 of each of the ribbons 22 and 32 have slightly different measurements due to the upward movement of the main roller 30. Therefore the amount of film 22 and 32 taken from the respective reels 25 and 35 can differ, especially when wads are deposited instead of single banknotes. In any case, the length variation of the sections 2 has already been calculated before deposit of the wad M in FIG. 4, i.e. when the rollers 20 and 30 are in reciprocal contact and, consequently, both the sections 2 have the same length.

Figure 5A:
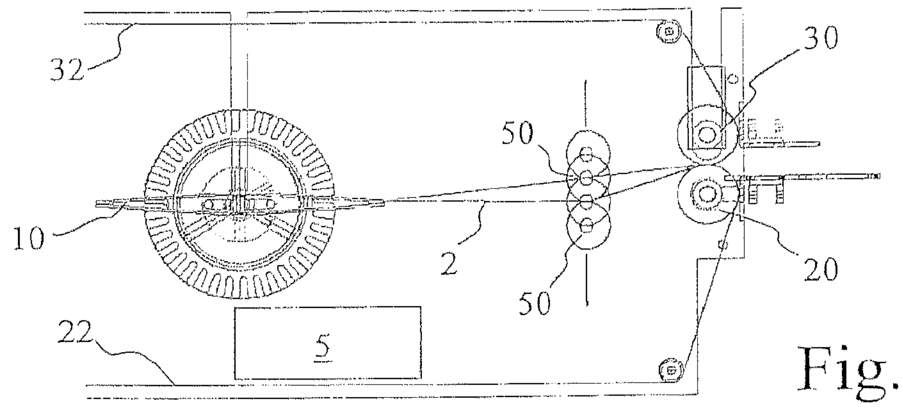
FIGS. 5A-5C are lateral views of a module for the storage of flat items according to other possible embodiments of the present invention.
Figure 5B:
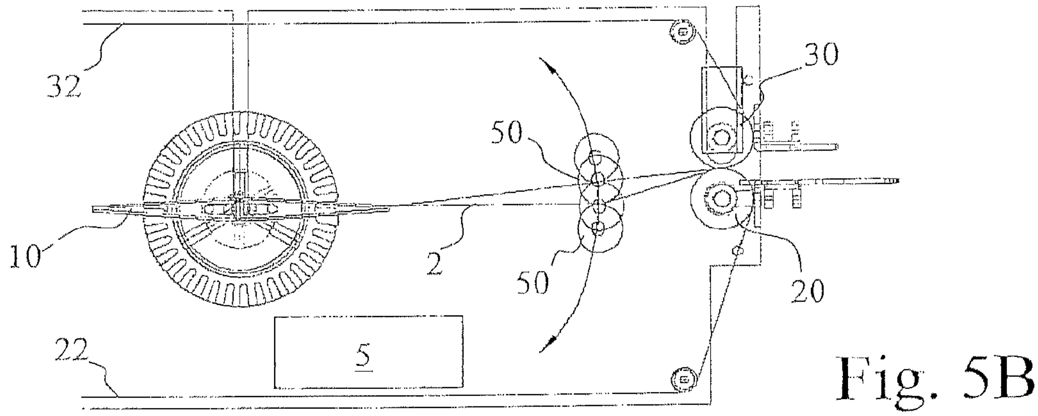
Figure 5C:
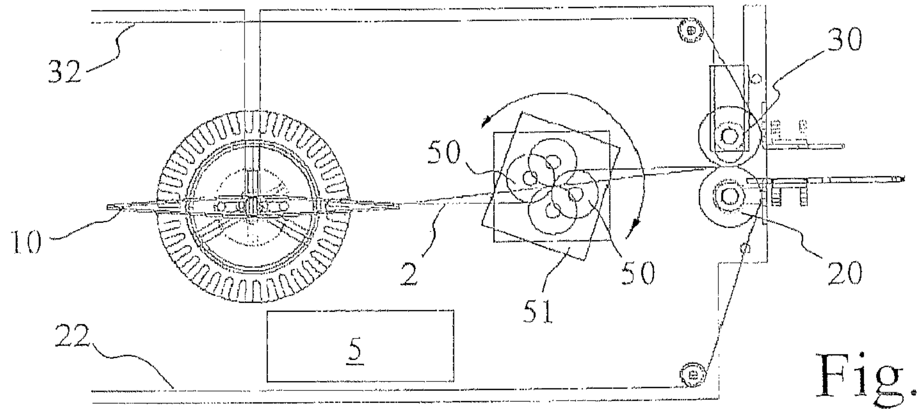

FIGS. 5A, 5B and 5C illustrate embodiments in which the length variation of the sections 2 can be varied using a pair of guide rollers 50 positioned between the plate 10 and the main rollers 20, 30.

The guide rollers 50 can for example be moved along a rectilinear path (FIG. 5A), or along a curved path (FIG. 5B). Alternatively, the guide rollers 50 can be fitted on a supporting plate 51 (FIG. 5C) which is rotated around an axis passing for example through the line of contact between the guide rollers 50.

Figure 6:
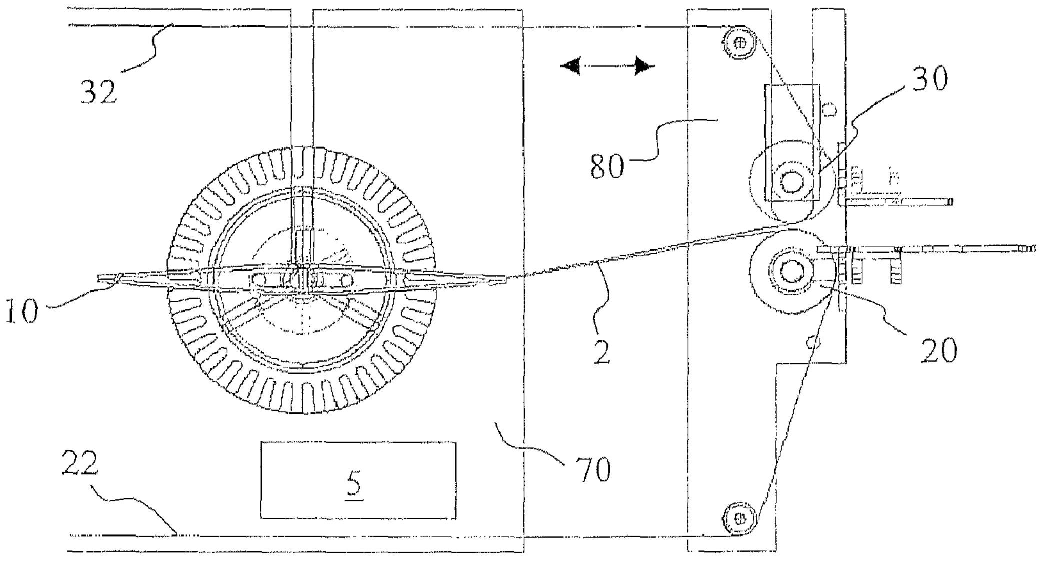
FIG. 6 is a lateral view of a module for the storage of flat items according to another embodiment of the present invention.

In the embodiment of FIG. 6 the module consists of two separate parts 70 and 80. A first part 70 includes the rotating plate 10 and all the control and drive systems for the plate and film winding reels, while the second part 80 includes the main rollers 20 and 30 and the groups of sensors 8 positioned at the module inlet.

By varying the distance between the two parts 70 and 80, for example by means of a worm screw together with appropriate guide rods (not shown), the length of the sections 2 can be varied. In the preferred embodiment, the part 70 is moved closer to and away from the part 80, while the part 80 is kept fixed since it includes the inlet aperture of the module which corresponds, once installed in a relative machine, to an access aperture obtained in the casing of the machine itself. This does not exclude, however, the possibility of moving the part 80 and maintaining the part 70 fixed, on condition that means are provided for transferring each flat item stored and/or dispensed between the access aperture of the machine and the main rollers 20 and 30.

Figure 7:
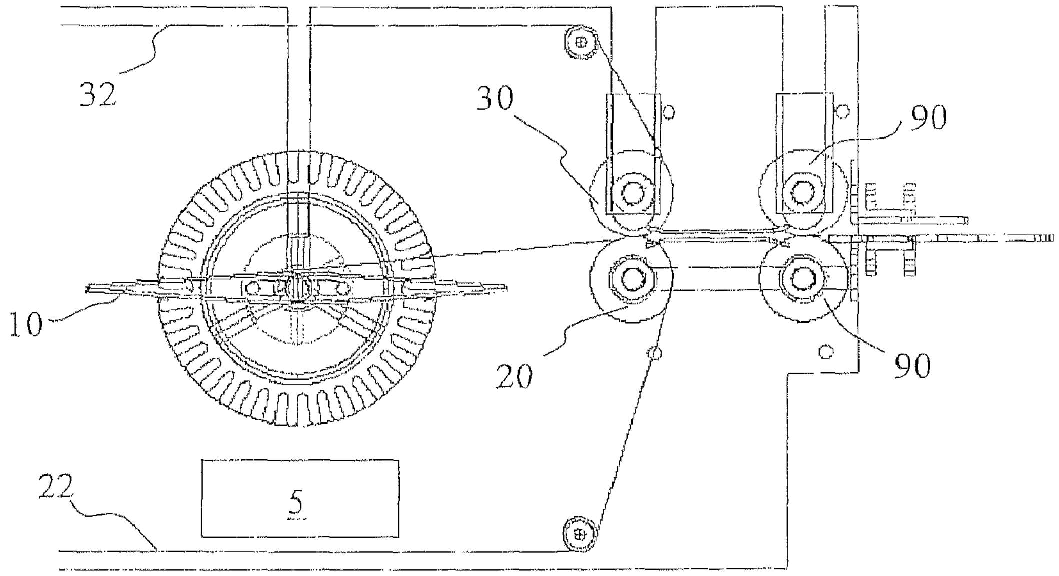
FIG. 7 is a lateral view of a module for the storage of flat items according to a further embodiment of the present invention.

A further embodiment of the module is illustrated in FIG. 7, which shows a pair of motorised rollers 90 positioned between the groups of sensors 8 and the main rollers 20 and 30. The motorised rollers 90 convey the flat items, controlling their speed and thus determining the anticipation (or delay) with respect to the beginning of rotation of the plate 10, so as to synchronise entry of the items between the rollers 20 and 30.

Various modifications can be made without departing from the scope of the present invention. For example, in addition to the optical type signalling devices described in the various embodiments, magnetic type signalling devices, and therefore sensors, can be used.

In addition to the use of films having equal width, the ribbon means can consist, for example, of a lower film 22 like the one represented so far and one or more upper films narrower than the lower film. Alternatively or in combination with the upper narrower films, there may also be one or more upper wires with cylindrical section, if necessary provided with magnetic type signalling devices.

The invention claimed is:

1. A method for controlling storage and dispensing of items, wherein said items are stored in a module, which includes:

at least one pair of main rollers;

at least one supporting element having at least two faces comprising one or more flat or convex portions, the at least one supporting element being rotatable; and ribbon means which are wound on said at least one supporting element to retain said items on at least one of the faces of said at least one supporting element during storage phases, and which are unwound from said at least one supporting element to release said items from said at least one supporting element during dispensing phases, said ribbon means passing around said main rollers, a variation of a length of said ribbon means being obtained for a portion of said ribbon means that extends between points of contact with said main rollers and points of contact with said supporting element and/or with the items, a position and/or angular velocity of said at least one supporting element being determined by detection of one or more encoder discs provided with signalling devices and integral in rotation with said at least one supporting element.

2. The method as claimed in claim 1, wherein said length variation is obtained by varying a rotation starting angle of said at least one supporting element.

3. The method as claimed in claim 1, wherein said length variation is obtained by means of one or more guide rollers acting on said ribbon means between the points of contact with said supporting element and the points of contact with said main rollers.

4. The method as claimed in claim 1, wherein said module consists of two separate parts, a first of said parts including said at least one support element and a second of said parts including said main rollers, and wherein said length variation is obtained by varying a reciprocal distance between said two separate parts that constitute said module.

5. The method as claimed in claim 1, wherein said length adjustment being obtained, at least in the storage phases, by rotation of said at least one supporting element and by adjustment of a flow speed of said items before the items reach said main rollers.

6. The method as claimed in any one of the preceding claims, wherein the length variation of said ribbon means is obtained after each feed-in phase, or after a dispensing phase, of at least one of said items.

7. The method as claimed in claim 1, wherein the length variation of said ribbon means is calculated according to a thickness of a last of the items dispensed by identifying the length of said ribbon means unwound from said supporting element after the dispensing of said last item.

8. The method as claimed in claim 7, wherein the length variation to be imparted to said ribbon means is calculated by a control unit and memorised in a memory of the same after each storage phase, and taken from said memory after each dispensing phase of said items.

9. The method as claimed in claim 1, wherein the length variation of said ribbon means being calculated and/or determined according to a thickness of a last of the items stored by identifying the length of said ribbon means necessary to envelop said last item and retain said last item on one of the faces of at least one said supporting element.

10. The method as claimed in claim 9, wherein the length of said ribbon means wound on said supporting element is determined according to detection by signalling devices combined with said ribbon means.

11. The method as claimed in claim 9, wherein the length of said ribbon means wound on said supporting element is determined on the basis of detection by signalling devices combined with one or more encoder discs rotated by the movement of said ribbon means.

12. The method as claimed in claim 1, 10, or 11, wherein said signalling devices are of an optical type.

13. The method as claimed in claim 1, 10, or 11, wherein said signalling devices are of a magnetic type.

14. A module for storing and dispensing items, comprising:

at least one pair of main rollers;

at least one rotating support element having at least two faces comprising one or more flat or convex portions;

ribbon means which are wound on said supporting element to retain said items on at least one of the faces of said supporting element during storage phases, and which are unwound from said supporting element to release said items from said supporting element during dispensing phases, and wherein said ribbon means pass around said main rollers, characterised by comprising means for obtaining a variation in a length of said ribbon means along a portion of the ribbon means that extends between points of contact with said main rollers and points of contact with said supporting element and/or with the items, one or more encoder discs rotating by movement of said ribbon means, and said encoder discs including signalling devices determining a length of said ribbon means wound on said supporting element in each of the storage or dispensing phases.

15. The module as claimed in claim 14, wherein said means for obtaining the variation in the length include at least one control unit for varying a rotation starting angle of said supporting element.

16. The module as claimed in claim 14, wherein said means for obtaining the variation in the length include at least one control unit for moving one or more guide rollers acting on said ribbon means between points of contact with said supporting element and points of contact with said main rollers.

17. The module as claimed in claim 14, wherein said module consists of two separate parts, a first of said parts including said rotating support element and a second of said parts including said main rollers, and wherein said means for obtaining the variation in the length include at least one control unit for varying a reciprocal distance between said parts constituting said module.

18. The module as claimed in claim 14, wherein said means for obtaining the variation in the length include at least one control unit to activate rotation of said supporting element and control rotation speed of one or more feed rollers positioned upstream of said main rollers to adjust a flow speed of said items before the items reach said main rollers.

19. The module as claimed in any one of the claims from 14 to 18, wherein said control unit is programmed to calculate the length variation to be imparted to said ribbon means and includes at least one memory for memorizing values calculated after each of the storage phases and recovering said values after each of the dispensing phases for each of said flat items.

20. The module as claimed in claim 14, wherein said ribbon means include signalling devices for determining the length of said ribbon means wound on said supporting element in each of the storage or dispensing phases.

21. The module as claimed in claim 14, wherein one or more encoder discs with signalling devices which are integral in rotation with said supporting element to determine position and/or angular velocity of said supporting element.

22. The module as claimed in claim 14, 20, or 21, wherein said signalling devices are of an optical type.

23. The module as claimed in claim 14, 20, or 21, wherein said signalling devices are of a magnetic type.

24. The module as claimed in claim 14, wherein at least one of said pairs of main rollers moves perpendicular to an axis of rotation to permit storage and dispensing of items having different thickness.

25. The module as claimed in claim 14, wherein said ribbon means include at least one lower ribbon and one upper ribbon of substantially identical width.

26. The module as claimed in claim 14, wherein said ribbon means including at least one lower ribbon and one or more upper ribbons narrower than said lower ribbon.

27. The module as claimed in claim 14, wherein said ribbon means including at least one lower ribbon and one or more upper wires with cylindrical section.

28. A machine for the storage and dispensing of banknotes or wads of banknotes as the items, characterised by one or more modules as claimed in claim 14.

* * * * *